Oct. 13, 1925.

B. F. AUGUSTINE 1,557,395

ROTARY GAS ENGINE

Filed Dec. 15, 1920          6 Sheets-Sheet 1

Inventor
Benjamine F. Augustine
By Sturtevant Mason
Attorneys

Oct. 13, 1925.

B. F. AUGUSTINE 1,557,395

ROTARY GAS ENGINE

Filed Dec. 15, 1920    6 Sheets-Sheet 4

Inventor
Benjamin F. Augustine
By Sturtevant & Mason
Attorneys

Oct. 13, 1925.

B. F. AUGUSTINE 1,557,395

ROTARY GAS ENGINE

Filed Dec. 15, 1920     6 Sheets-Sheet 5

Inventor

Benjamine F. Augustine

By Sturtevant & Mason

Attorneys

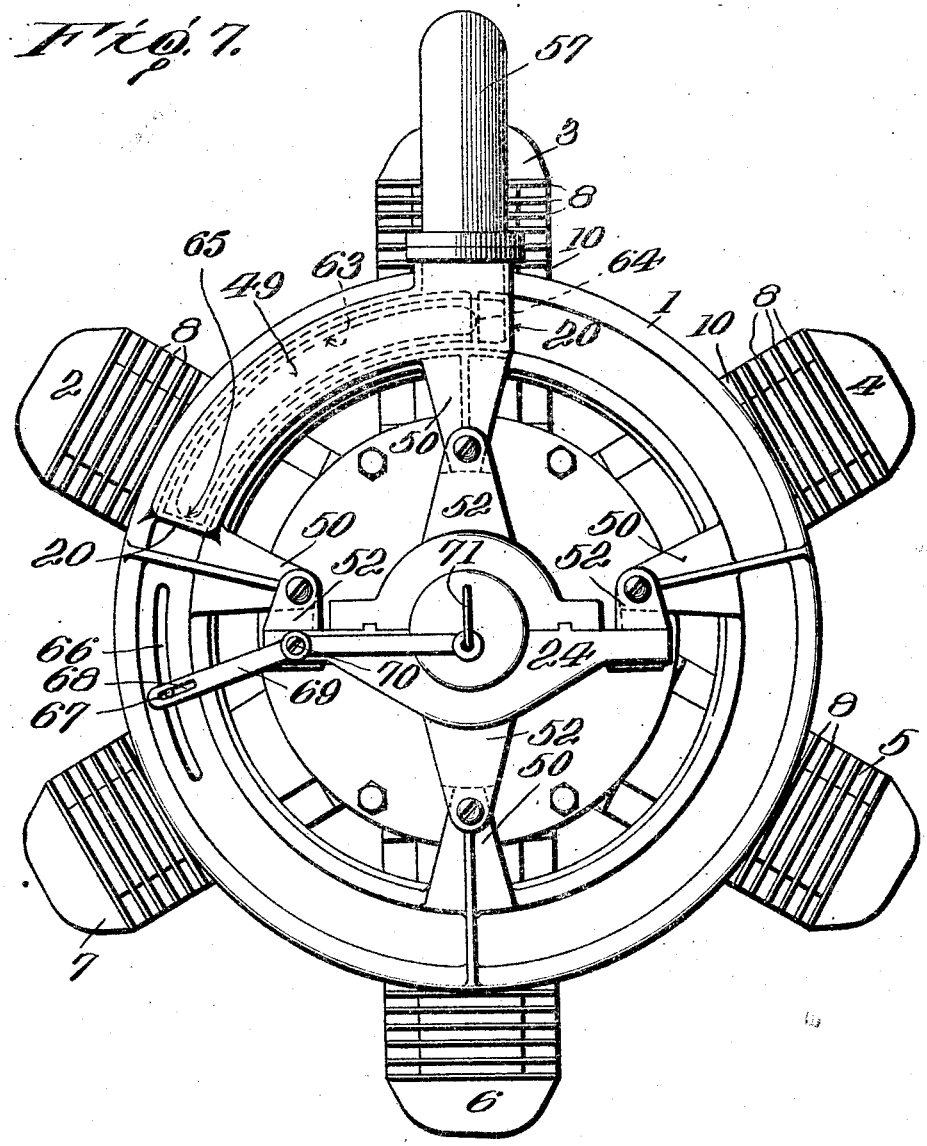

Patented Oct. 13, 1925.

1,557,395

UNITED STATES PATENT OFFICE.

BENJAMIN FRANKLIN AUGUSTINE, OF BUFFALO, NEW YORK.

ROTARY GAS ENGINE.

Application filed December 15, 1920. Serial No. 430,878.

*To all whom it may concern:*

Be it known that I, BENJAMIN F. AUGUSTINE, a citizen of the United States, residing at Buffalo, in the county of Erie, State of New York, have invented certain new and useful Improvements in Rotary Gas Engines, of which the following is a description, reference being had to the accompanying drawing and to the figures of reference marked thereon.

The invention relates to new and useful improvements in gas engines, and more particularly to a gas engine of the two-cycle type.

An object of the invention is to provide a gas engine of the above type with means for delivering the fuel gases to the cylinder continuously and at relatively low pressure during the entire time that the intake port is open so as to provide for an efficient scavenging of the cylinder with little or no intermixing of the incoming fuel gases with the burnt gases.

A further object of the invention is to provide a gas engine of the above type wherein the delivering means receives its supply of fuel gases direct from the carburetor so that variations in the throttle of the carburetor will immediately vary the amount of fuel supplied to the engine.

A further object of the invention is to provide an engine of the above character with means for closing the exhaust port so as to prevent overflow of the incoming fuel gases when the engine is operating under full load.

Another object is to provide an engine of the above character wherein the exhaust port is closed before the intake port and forcible means continues to deliver fuel gases to the engine cylinder thus putting the fuel gases under an initial compression.

A further object of the invention is to provide a gas engine of the above type with a pump for each cylinder, which pump is so timed and proportioned as to deliver the gases to the engine cylinder continuously and at low pressure during the entire time that the intake port is open.

A further object of the invention is to provide a gas engine of the above type wherein the pumps take their charge direct from the carburetor by suction and wherein the suction pull of the pumps begin at the point of cut off of the cylinder with which it is associated.

Another object of the invention is to provide a gas engine of the rotary radial cylinder type for self-propelled vehicles or the like, wherein a fixed crank serving as an abutment for causing the rotation of the engine is disposed at one end of the engine casing and supported by a bearing closely adjacent the engine cylinders, and wherein the power shaft is connected to the other end of the engine casing.

A still further object of the invention is to provide an engine of the above type wherein pump cylinders are disposed between the engine cylinders and the inner end of the power shaft, and the pistons in the pump cylinders are connected to a crank detachably, but rigidly secured to the fixed crank of the engine and located between said fixed crank of the engine and the inner end of the power shaft.

These and other objects will in part be obvious and will in part be hereinafter more fully disclosed.

In the drawings which show by way of illustration one embodiment of the invention—

Fig. 7 is an end view of the engine.

Figure 1:
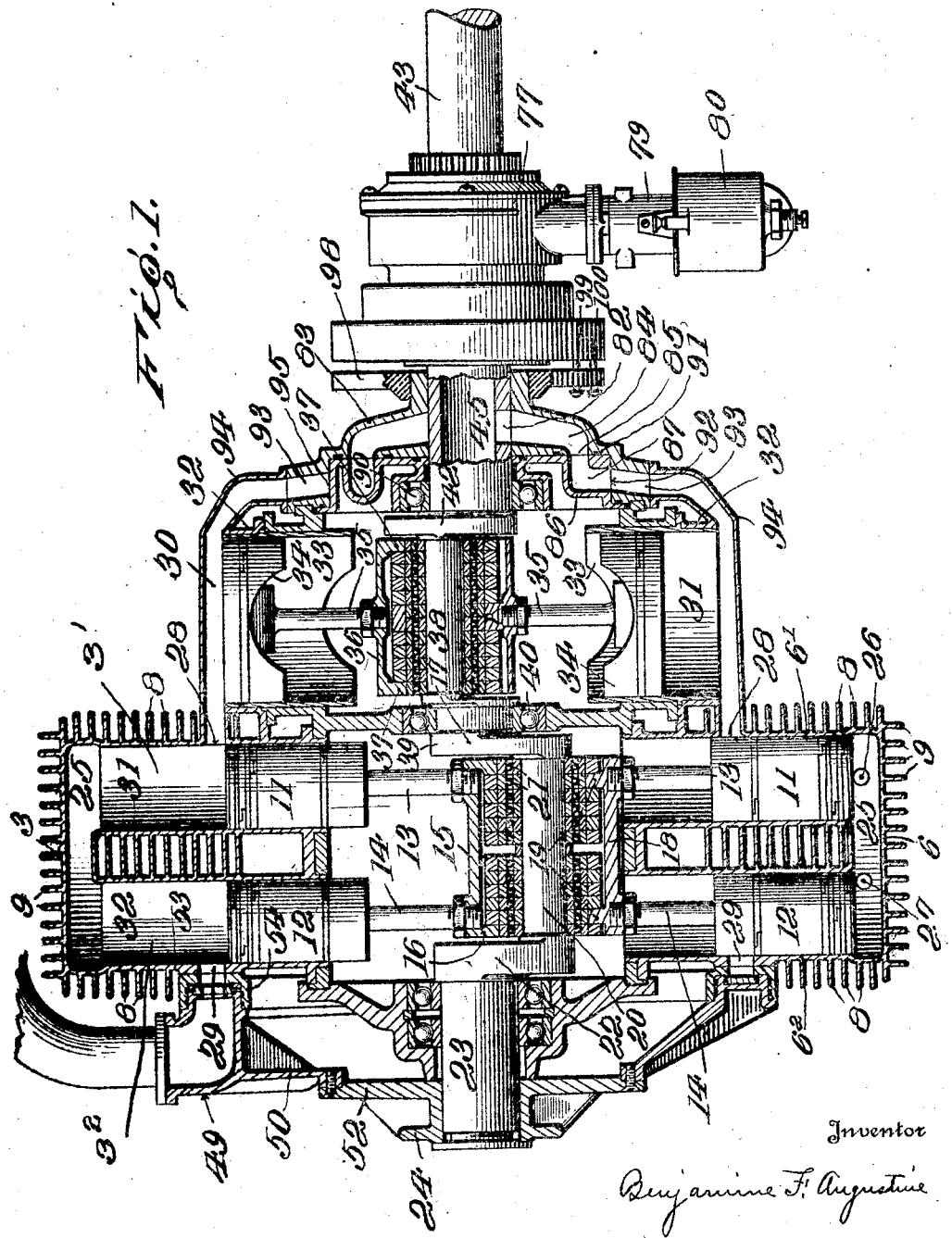
Figure 1 is a vertical sectional view through my improved engine showing the pistons in certain of the cylinders as passing dead center with the intake and exhaust ports open and in the opposed cylinders as passing dead center with the gases under full compression.

The invention in its broadest aspect is directed to a two-cycle engine. In this type of engine as heretofore constructed, the fuel gases are caused to enter the engine cylinders under considerable pressure, and as a result, the inrushing gases cyclone and penetrate and mix with the burnt gases of the previous explosion and thus greatly decreasing the efficiency of the engine. The present invention consists in providing means for delivering the fuel gas to the cylinders continuously and at low pressure during the entire period that the intake ports are open, and as a result, the incoming fuel gases pass underneath the burnt gases and force said burnt gases as a body, forward and out of the cylinders through the exhaust ports which are made extremely large to facilitate the scavenging of the cylinders. This is particularly true in an engine of the twin cylinder type wherein the fuel gases enter through the intake port controlled by the piston in one cylinder and are forced out through the exhaust port controlled by the piston of the other cylinder. In such an engine, no baffle plates are necessary. The exhaust port opens first relieving the burnt gases from pressure. The piston on the intake cylinder draws away from the burnt gases and the incoming fuel gases move forward by the forcible delivering means, but at low pressure, pass underneath the burnt gases and move the same forward bodily and out through the exhaust port.

This result of uniform flow of the incoming fuel gases is preferably accomplished by an arrangement of pumps, one for each cylinder, which pumps have a much greater capacity than the demand under full load, and are so timed and controlled as to deliver the fuel gases to the cylinders at relatively low pressure and continuously during the entire time that the intake ports are open. In an engine of the two-cycle type, when working under load, the inrushing fuel gases overflow or pass out through the exhaust port, thus greatly decreasing the efficiency of the engine. Another feature of my invention is an exhaust port controlling means which is independent of the normal means for opening and closing the exhaust ports, which closing means covers the exhaust ports prior to the closing of the same by the normal exhaust port closing means, and is of such character as to hold back the fuel gases and prevent overflow of the same. The closing means for the exhaust ports is adjustable as to timing and may be shifted at will to secure the best efficiency under different conditions of throttling. The closing means is preferably set so as to close the exhaust ports just as the piston passes dead center. At this time, the intake ports are open. The pumps continue to forcibly deliver fuel gas to the cylinders and as the exhaust ports are closed the charge in the cylinders will be put under an initial compression.

As above noted, in the preferred embodiment of the invention, the incoming gases pass in through an intake port controlled by the piston in one of the twin cylinders and the burnt gases are forced out through an exhaust port controlled by the piston of the other twin cylinder. These twin cylinders are spaced, and provided with radiating ribs which extend all the way around each cylinder and across the upper ends thereof, and each cylinder is provided with a deflecting rib extending longitudinally thereof and in the center plane of the cylinders, so that as the cylinders rotate, the air striking said deflecting ribs will be equally distributed on both sides thereof, and thus forced through between the two cylinders. By this arrangement I have provided a very efficient air cooled engine.

At the outer end of each cylinder there is a spark plug, so that there are a pair of spark plugs for each twin arrangement of cylinders. These spark plugs are inclined outwardly toward the end of the cylinder, which greatly aids in the keeping of the spark plug clean as the centrifugal force, due to the rapid rotating of the cylinders will cause any oil or the like tending to accumulate on the spark plug electrodes to be thrown therefrom. The engine as above noted is preferably of the rotary type and associated therewith is a fixed crank. The fixed crank is at the end of the casing adjacent the cylinders, and is mounted in bearings disposed close to the cylinders so that said crank forms a very rigid abutment for the pistons to work against while expanding gases are rotating the engine. The power shaft is connected to the other end of the casing and the pumps are located between the power shaft and the stationary crank. The pistons in the pumps are connected to a crank which is detachably fixed to the stationary crank of the engine and disposed between said stationary crank and the main power shaft.

The main power shaft is provided with a central intake fuel passage which connects in turn with the pump chambers through passageways controlled by a cut-off disc. The carburetor is preferably suspended from the power shaft and of course is held from rotation. Between the carburetor and the power shaft is an intermediate chamber through which the fuel gases pass to the intake passage in the power shaft. This chamber is relatively small so that in effect the pump takes its charge direct from the carburetor and the amount of fuel gas delivered will respond almost immediately to the throttling of the carburetor. Said power shaft has a plurality of openings which permit the gases to enter the intake passage from said intermediate chamber. In this intermediate chamber I have arranged a series of rotating screens which serve to thoroughly mix the fuel gases and break up any globules of fuel, thus aiding very greatly in the vaporization of the fuel gases in the cylinders.

In my prior Patent No. 1,229,569, granted June 12, 1917, I have shown and described in detail a rotary two-cycle engine of the twin cylinder type and wherein the cylinders are fired in the one, two, three, etc., order, that is, in succession. The preferred form of my present invention is embodied in an engine of the type shown in said patent. The invention will be possibly better understood by a detail description of the construction of my preferred form of engine, during which description other important features will be pointed out.

Figure 2:
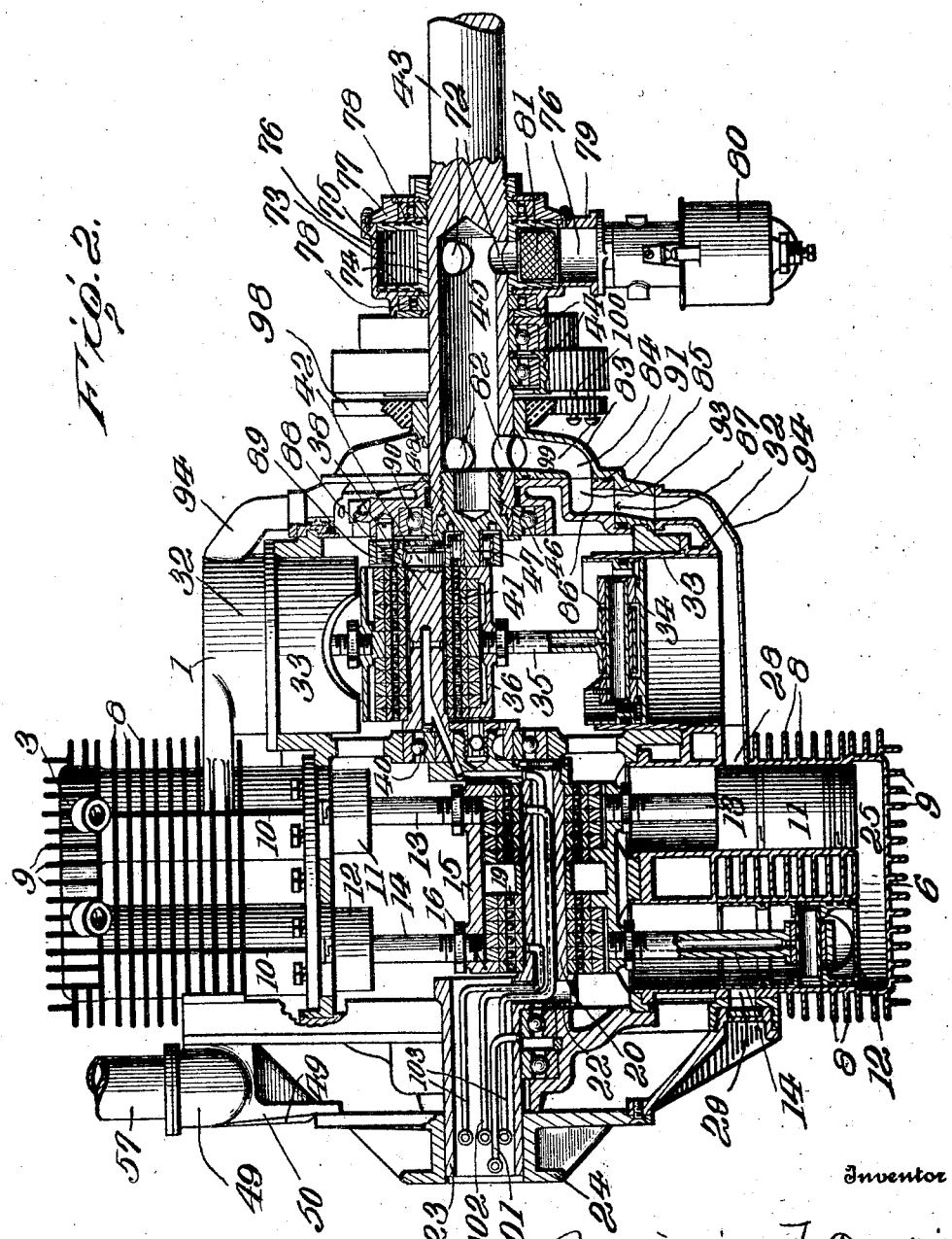
Fig. 2 is a view partly in front side elevation and partly in vertical section of the same showing also the carburetor and the manner of supplying the gas to the pumps.

The engine consists of a main casing 1, which is provided with a plurality of radially disposed twin cylinders. These cylinders are indicated in the drawings at 2, 3, 4, 5, 6 and 7, respectively. There are as above noted, twin cylinders located side by side at each of these positions 2, 3, 4, 5, 6, and 7. In Fig. 1, I have indicated the twin cylinders at 3, by $3^1$ and $3^2$ and at 6 by $6^1$ and $6^2$. These cylinders are detachably connected to the engine casing 1 and are spaced from each other. Extending all the way around each cylinder are projecting radiating ribs 8. The ends of the cylinders are also provided with radiating projecting ribs 9. These ribs between the two cylinders are connected together. The two cylinders and the radiating ribs are all cast in one block. There are also deflecting ribs 10 which extend longitudinally of each cylinder as shown in Fig. 2. As the engine casing rotates, the cylinders rotate therewith, and these deflecting ribs 10 will divide the air so that an equal part flows to the right around each cylinder and to the left around each cylinder as viewed in Fig. 2. This forcibly causes the air to pass between the cylinders which greatly increases the efficiency in the cooling of the cylinders.

Located in the cylinder $3^1$ is a piston 11 and in the cylinder $3^2$ is a piston 12. It will be understood that each pair of cylinders is provided with similar pistons. These pistons are connected respectively to piston rods 13 and 14 which in turn are connected to a common cross bar 15 (see Fig. 1). This cross bar 15 is formed integral or as a part of the end rings 16 and 17. The piston rods 13 and 14 associated with the pistons in the cylinders $6^1$ and $6^2$ are connected to a bar 18 which in turn is connected to or formed integral with other rings 19. Likewise the piston rods of the various cylinders are connected to pairs of rings, there being a separate pair of rings for each pair of cylinders. These rings are all located on the fixed crank 20 and ball bearings 21 are placed between the rings and the fixed crank. The fixed crank 20 is formed integral with the crank arm 22 and said crank arm 22 is formed integral with the shaft section 23 which in turn is fixed to the cross frame 24 (see Fig. 2).

The cylinders in each pair are connected at their outer ends by a passage 25 as in my prior patent. The clearance, however, in the present engine is made comparatively small. Located at the upper end of each cylinder are spark plugs 26 and 27, respectively. As clearly shown in Fig. 3 of the drawings, these spark plugs are inclined outwardly away from the center of rotation of the engine, from their outer end toward their inner end, and as a result, any oil tending to collect in the spark plugs will be forced off from the plugs by centrifugal force. In other words, the surfaces on which the oil tends to accumulate, are inclined to the direction of the centrifugal force acting on the oil, and therefore it will be carried off from these surfaces. Furthermore, by providing each cylinder with a spark plug adjacent its outer end insures that the charges at the upper end of each cylinder will be simultaneously exploded. In other words, the point of ignition of the charge over each piston is substantially the same distance from the respective pistons, and therefore the explosions take place at the same time, and the expansion force of the gases will be timed so as to be equally distributed upon the two pistons.

The fuel gases are taken into the cylinder $3^2$ through the intake port 28 and are exhausted from the cylinder $3^1$ through the exhaust port 29. The exhaust port is made relatively large so that the burnt gases may be quickly scavenged therethrough. Both the intake and exhaust port are controlled by the pistons, and the exhaust port is so proportioned as to open before the intake port, so as to relieve the pressure on the cylinders before the intake port is opened. Furthermore, it will be noted that by the use of twin cylinders, such as I have shown, no baffle plates are necessary. The means for delivering the fuel gases to the cylinders is so constructed as to deliver the fuel gases continuously during the entire time that the intake ports are open, and at relatively low pressure. I prefer to use a pump for each cylinder. In Fig. 1 of the drawings I have shown two of the pump cylinders at 30 and 31. The pump cylinder 30 is associated with the twin cylinders 3 while the pump cylinder 31 is associated with the twin cylinders 6. Cast in block with the two cylinders is the pump cylinder or supporting ring of the pump cylinder. Said ring is indicated at 32. Carried by this ring is a sleeve 33 which forms the pump cylinder proper. Located within the sleeve is a piston 34. There is a pump piston of course for each cylinder. The piston 34 is connected by a piston rod 35 which in turn is connected to a cross bar 36 carrying rings 37, 37 which engage the crank 38. This crank 38 has a fixed but detachable connection with the crank 20 through an intermediate arm 39. There is a ball bearing in the main housing of the engine indicated at 40 for the section of the shaft between the cranks 20 and 38. Each pump piston is connected to a cross bar which in turn carries rings cooperating with the shaft 38 and ball bearings 41 are placed between these rings and the crank 38. This crank 38 at the right hand end as viewed in Fig. 2 carries an arm 42. The power shaft of the engine is indicated at 43, and said power shaft is mounted in a suitable ball bearing 44. Said power shaft is bored to form an inner chamber 45. Threaded into the outer end of the chamber 45 is a cap plate 46. This cap plate is provided with a stud 47, and the arm 42 engages said stud 47. There are roller bearings 48 between this stud and the arm. This forms a very rigid support for the iner end of the crank 38, and at the same time permits the power shaft to rotate freely.

Coming back to the pump structure, it will be noted that the intake port 28 is connected directly to the pump chamber. The outer end of each pump cylinder is inclined outwardly from right to left as viewed in Fig. 1. Through this inclination of the outer wall, centrifugal force aids in the draining of any liquid parts or heavy gases tending to accumulate in the upper end of the pump chamber. They are drained through into the cylinder and pass out through the exhaust ports. The crank 38 is so set relative to the crank 20, that the pump piston passes its outer dead center just as the piston 12 controlling the intake port cuts off the intake port. In other words, the pump piston continues to deliver fuel gases to the cylinders until the point of cut off occurs, then the pump piston reverses its movement, and draws in a new charge to be delivered to the cylinders. The pump for each pair of cylinders may be of greater capacity than the demand of the cylinders under full load which would be of great value, particularly in an engine used for aeroplane work, where the atmospheric conditions under which the engine works vary greatly. The pump piston passes its dead center at the other end of its stroke when the cylinder 12 is on its expansion stroke and is at a point midway between the outer end of the cylinder and the upper edge of the intake port. At this time, however, the pump piston is moving very slowly because of passing over the dead center, and before the gases drawn into the pump cylinder are put under much compression, the piston 12 reaches a point so as to uncover the intake port. The gases in the pump cylinder are at a relatively low pressure. I have found that even as low as one pound pressure is a good working pressure. As soon as the intake port is opened, the pump piston forcibly delivers the fuel gases to the cylinders and continues its delivering of the fuel gases all the time the intake port is open. As above noted, the exhaust port opens before the intake port and relieves the burnt gases of pressure. As a result, the piston 12 will move away from the burnt gas when the intake port is opened and the incoming fuel gases at low pressure will move across the top of the piston 12 underneath the burnt gases and will crowd the burnt gases forward and out through the exhaust port. This delivering of the fuel gases to the engine cylinders at low pressure and continuously with a substantial uniform inflow of the fuel gases avoids the mixing of the fuel gases with the burnt gases, one of the difficulties which have been experienced heretofore in two-cycle engines.

Before describing the means for delivering the fuel gases to the pump, I wish to describe in detail the manner of controlling the exhaust ports of the cylinders. As above noted, the exhaust port 28 is primarily controlled by the piston 11. The exhaust port of each cylinder in turn delivers the burnt gases into a chambered receiving ring 49. This receiving ring extends all the way around the engine casing and is provided with inwardly extending arms 50 which are connected to fixed bracket arms 52, respectively carried by the cross frame 24.

Attached to the engine cylinders are spaced channel members 53 and 54. The receiving ring 49 extends between these channel members and packing rings 55 form a tight joint between the receiving ring and the channel members. The chambered receiving ring 49 remains stationary, while, of course, the cylinders and the channel members 53 and 54 rotate. The chamber in said ring 49 receiving the burnt gases is indicated at 56. Attached to the chambered ring 49 and connected with the chamber 56 therein is an exhaust pipe 57. The inner face of the chambered ring 49 between the ends of the chamber 56 is recessed, as indicated at 58, and located in this recess is a ring 59. Said ring is provided with grooves 60 and 61 in the edges thereof and screws 62 carried by the chambered ring 49 extend through into these grooves, thus the ring 59 is carried by the stationary chambered ring 49, and this stationary chambered ring 49 is supported by the bracket arms free from contact with the rotating engine except through the channel members and packing rings above described. The ring 59 has an opening 63 therethrough which is of substantially the same extent in shape as the inner face of the chamber 56. This ring 59 is capable of being shifted so as to cover to a greater or lesser extent the chamber 56 at the end 64 thereof.

Figure 3:
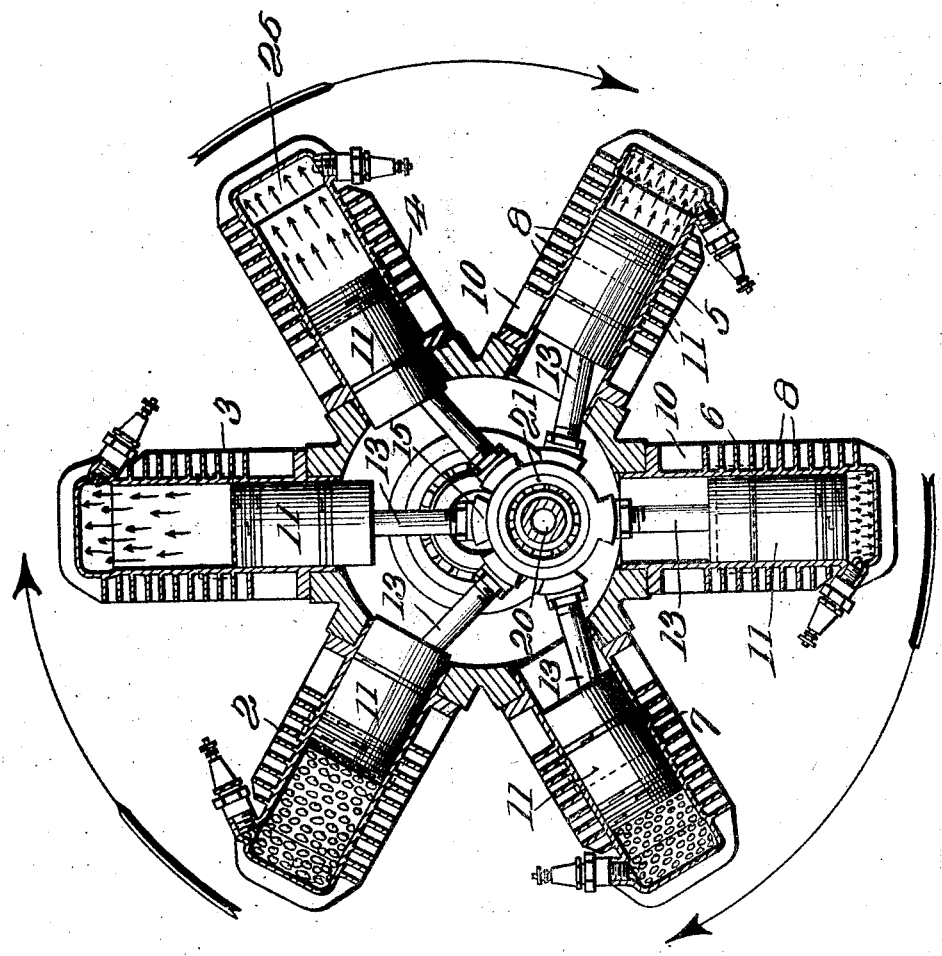
Fig. 3 is a view showing more or less diagrammatically a vertical section through the cylinders and the condition of the gases in the several cylinders.
Figure 4:
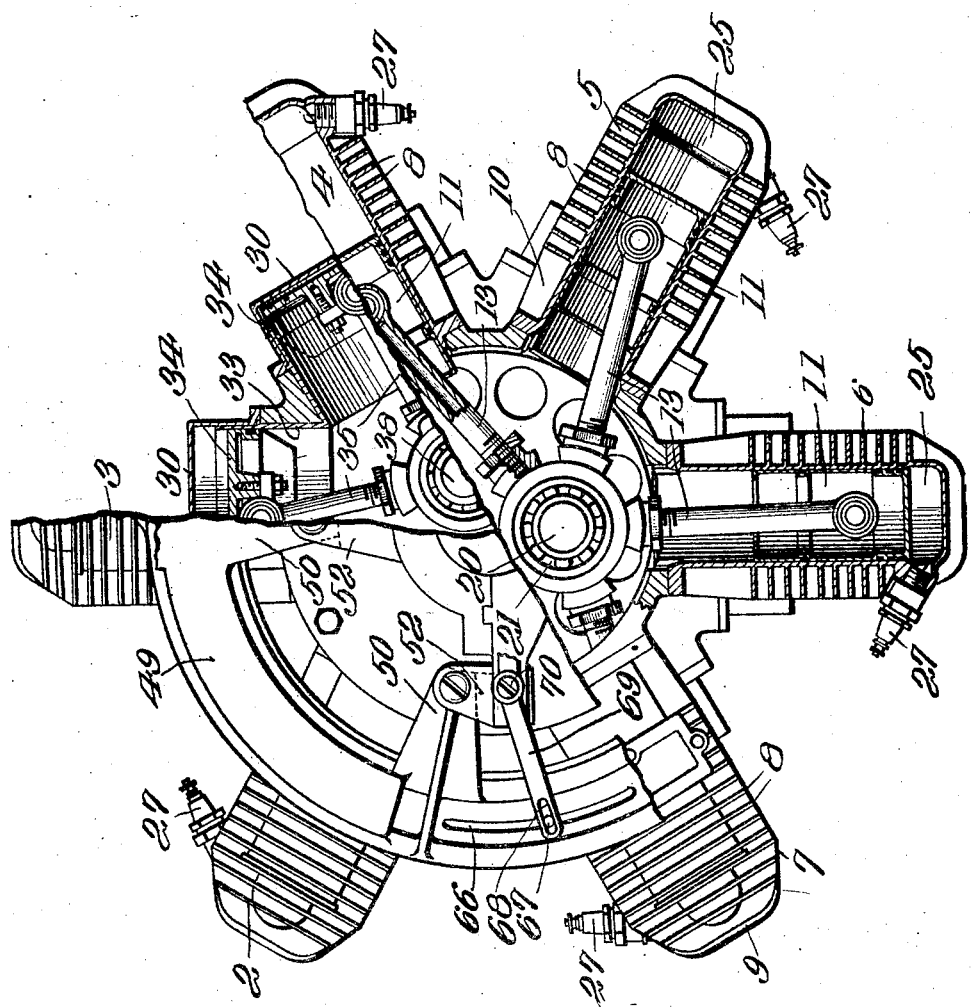
Fig. 4 is a view partly in vertical section and partly in end elevation showing the several cylinders of the engine and certain of the pump cylinders, and the respective positions of the fixed cranks for the pump pistons and the cylinder pistons.
Figure 5:
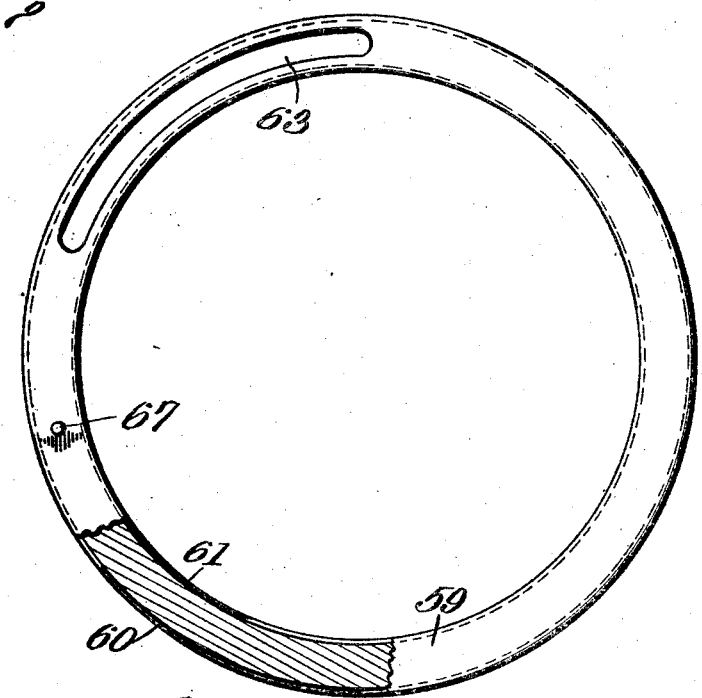
Fig. 5 is a front view of the adjustable cut off ring for the exhaust ports.
Figure 6:
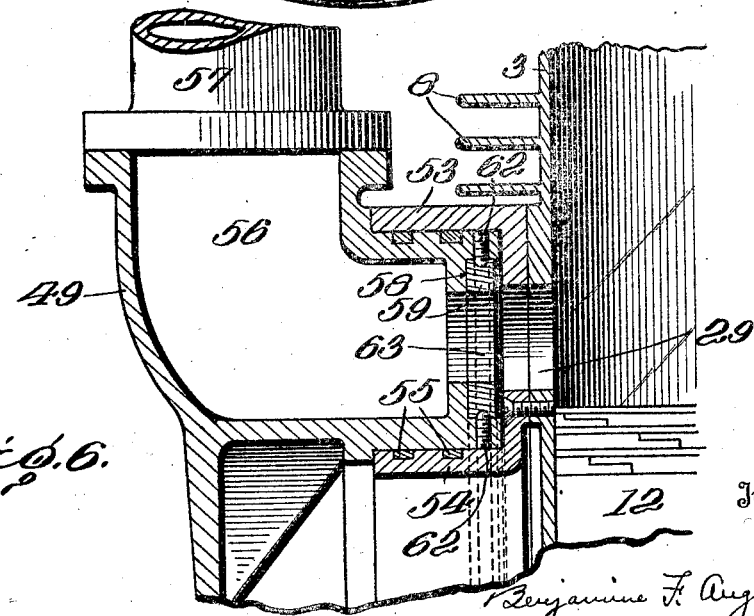
Fig. 6 is an enlarged sectional view showing the manner of supporting the cut off ring on the chambered ring for receiving the exhaust gases.

It will be apparent that as the cylinder rotates in the direction of the arrow shown in Fig. 3, the exhaust port is first uncovered by the end 65 of the chamber 56. The gases then exhaust freely into this chamber and out through the exhaust pipe. When, however, the cylinder reaches the end 64 of the chamber 56, then the exhaust port is covered for the reason that the remainder of the ring 59 and the inner face of the chambered ring 49 become a cover plate for the exhaust port. The purpose of this cover plate for the exhaust port is to prevent overflow of the incoming gases. This plate 59 as above noted, is adjustable, but is preferably set so that the exhaust port is covered just as the pistons pass dead center and begin their relative movement to close the exhaust and intake ports. This covering of the exhaust port performs another function aside from preventing the overflow of the incoming gases, and that is, it enables the gases in the cylinders to be put under initial compression which is of great value particularly in an engine working in an aeroplane in high altitudes. The covering of the exhaust port before the intake port and the continued uniform inflowing of gases through the forcible means, delivering the same to the cylinders, enables the gases to be put under initial compression and insure a full working charge under all conditions of atmospheric pressure and under full load. It is understood that this is in no sense a valve, but merely a holding disk which temporarily covers the exhaust port before the piston has a chance to cover it, and as above noted, prevents overflow, and under certain conditions, insures an initial compression in the cylinders.

As one means for shifting the ring 59, I have shown the chambered ring 49 as provided with a slot 66. The ring 59 carries a pin 67 which extends into the slot 68 in the end of the lever 69. This lever 69 is pivoted at 70 to the framework 24, and the free end of the lever is connected to a suitable flexible member 71 which may be led to a point where it is accessible to the operator of the machine so that this ring may be shifted to close the exhaust port at earlier or later periods, if desired. By this adjustment, great efficiency in the operation of the engine may be obtained under various throttled conditions and also when working under varying atmospheric conditions. As above noted, however, the ring is preferably set so as to close the exhaust port substantially at a time when the piston associated with the cylinder having the exhaust port is passing dead center.

The means whereby the fuel gases are delivered to the pumps will now be more fully described. The chamber 45 in the power shaft 43 is provided with ports 72. Mounted on the power shaft 43 and rotating therewith is a sleeve 73 provided with side members 74 and 75 preferably formed integral therewith. The ports 72 extend through this sleeve and into the chamber 76 formed by these side members 74 and 75. Surrounding the side members 74 and 75 is a casing 77. This casing is supported by ball bearings 78 and suitable packing rings are provided between the casing and the side members 73 and 74 so that said chamber 76 is a closed chamber. Carried by the casing 77 is a pipe extension 79 to which a carburetor 80 is attached so that the carburetor delivers its fuel gases directly into this chamber 76 and from the chamber 76 through the ports 72, of which there are preferably three, into the chamber 45 in the power shaft. It will be understood that the sleeve 73 rotates with the power shaft, while the casing 77 and the carburetor 80 supported thereby, are attached to the main bearing and remain stationary. I also provide the sleeve 73 with radially disposed screens 81, preferably three in number. These screens rotate with the power shaft as the sleeve rotates with the power shaft, and the sleeves perform the function of thoroughly mixing the fuel gases and air and breaking up any globules of fuel gas, so that the fuel gas goes into the chamber 45 in the condition in which it will readily volatilize.

The power shaft is provided with ports 82 which are also preferably three in number. Connected to the engine casing and rotating therewith is a cap 83 and this cap is chambered as indicated at 84 and connected with the port 82. The chamber 84 opens at 85 all the way around and a cut off ring or disk 86 mounted on the inner end of the power shaft 43 is provided with a chamber 87 extending all the way around and having an opening registering with the opening 85, so that this chamber 87 is in a sense an extension of the chamber 84. This cut off ring 86 is held from rotation by means of a pin 88 which is carried by an arm 89 fixed to the end of the crank 38, which crank is stationary, as above described. There is a ball bearing 90 between this cut off ring and the inner end of the shaft. There are also suitable packing rings 91 between the inner face of the ring 86 and the inner face of the cap plate 83, so as to make a tight joint between these two members and prevent the escape of the gases. The cut off ring 86 is provided with a port 92 which connects with the chamber 87 at a certain portion of the circumference of the cut off ring. The engine casing is provided with ports 93 connected by a pipe 94 with the respective pump chambers so that as the cylinders rotate, these ports 93 will in turn register with the ports 92 leading to the chamber 87, and in turn the port 93 will be cut off by the peripheral portion 95 of the cut off disk as shown at the upper part of Fig. 1, while at the lower part of Fig. 1, the port 93 is shown connected with the chamber 87. As the engine rotates, this cut off ring 86 serves to establish a connection between the pump cylinder and the chamber 45 in the power shaft, and thus the carburetor at the time when the pump is drawing its gas. Said pump cylinder is cut off from connection with the chamber 45 during the entire time that the pump is delivering gas to the cylinders of the engine. Attention is particularly called to the fact that the pipes 94 are very short and that the cut off occurs at the inner end of the port 93 which is also very short, and as a consequence when the pump is delivering gas to the cylinders, there is very little space between the pump cylinder and the point of cut off with the supply into which the gases may be compressed. There is also very little clearance in the pump-cylinders so that the gases will be forcibly delivered into the cylinders at substantially a uniform flow.

In the operation of the engine, it will be noted that the pumps in turn draw the supply from the carburetor, and that the chambers through which the gases pass to the chamber are comparatively short. The pump draws in its charged through suction, the intake port being closed just as the pump piston starts on its suction stroke. The amount of gas drawn in by each pump will depend upon the throttled condition of the carburetor. The throttling of the carburetor immediately changes the amount of fuel drawn in by the pump and as the pump delivers the fuel gas direct to the cylinder at each stroke supplying the cylinders with the desired amount of gas, it will be noted that the throttling of the carburetor immediately brings a response in the throttling of the engine. It is apparent that this cannot be accomplished in an ordinary two-cycle engine where the gases are taken into the cylinder from the compression chamber with the gases under considerable pressure, but by doing away with this intermediate compression chamber and by delivering the gases to each cylinder direct by the pump and at relatively low presure, the engine responds immediately to the throttle. It will be noted that inasmuch as the charge delivered to the engine depends upon the suction stroke of the pump, that the throttling conditions and the effect upon the engine is practically the same as in a four-cycle engine, and the same quick response to the throttle is accomplished in my two-cycle engine as has heretofore been accomplished in a four-cycle engine.

It will also be noted that the engine casing is mounted throughout on ball bearings, and that there are also ball bearings between the rings attached to the pistons and the stationary cranks, and as a consequence the engine is practically frictionless at it rotates.

The spark plugs are connected by suitable wires with terminals 26 and 27 respectively. These terminals are carried by a commutator block 98 which rotates with the engine. Current is supplied through suitable yielding contact members 99 and 100, respectively, and the commutator sections as above noted, are so disposed and the connections with the spark plugs so made that the cylinders are fired one after another in succession. It will be noted that the stationary crank is connected to the frame at a point close to the cylinders which may be a very rigid durable connection for the stationary crank. The power shaft is connected at the other end of the casing to the cap plate 83, and this makes a very durable connection with the engine. The pump cylinders are between the power shaft and the engine cylinders. The carburetor is adjacent the end of the power shaft and comparatively close to the pump cylinders and thereby I have provided an engine wherein the fuel gases are taken from the carburetor through relatively short passages to the pump and delivered by the pump directly to direct connections with the cylinders. The throttling of the carburetor immediately varies the amount of fuel gases drawn in by the respective pumps and thus the amount of gas delivered by the pumps to the cylinders. Under full load, as soon as the exhaust port opens, the burnt gases are relieved from pressure, then the intake port opens and the piston controlling the intake port moves away from the burnt gases while the fresh fuel gases move underneath the burnt gases over the top of the piston controlling the intake port and by the continued forward movement of the fuel gases force the burnt gases out through the exhaust port, and as soon as the exhaust gases are excluded from the cylinders, the exhaust port is covered by the cover plate, and any overflow of the rich fuel gases is avoided, and under certain conditions, if desired, this auxiliary means for closing the exhaust port may be timed so that the pump continuing to deliver its charge will place the gas in the cylinder under slight compression. It will also be obvious that under throttled conditions, where only a small portion of the fuel gases are taken in the cylinders as the engine rotates, and the pistons move relative to the cylinders to compress the gas, the fresh gas will be carried by the piston up to the spark plug associated with the cylinder having the intake port and thus insuring that under even throttled conditions, the fresh incoming fuel gas will be brought to and about the spark plug so as to be ignited and with little intermixing with the burnt gases of the previous explosion.

Particular attention is called to the simplicity of the engine, and some of the features which contribute to this simplicity are as follows: The twin cylinders and pump cylinder in effect are all cast in block, all valves requiring nice seating and so forth are eliminated, the pistons controlling the intake ports, the pistons plus the auxiliary rings controlling the exhaust ports, and the cut-off ring controlling the pump ports; comparatively few parts thus being required. The pumps serve in effect as a transfer means for transferring the fuel gases direct from the carburetor to the cylinders, each pump operating forcibly to produce a uniform flow of the fuel gas into the cylinder all the time that the intake port is open.

In Fig. 2 of the drawings, I have shown my improved oiling means for supplying oil to the several bearings which consists of a series of pipes. The pipe 101 supplies oil to the bearing for the casing adjacent the stationary section of the shaft. The pipe 102 supplies oil to the ball bearing between the two crank sections and also oil to the ball bearings between the rings and the piston rods of the pumps. The pipes 103 supply oil to the ball bearings between the fixed crank and the rings attached to the several piston rods. By this means, I provide a lubricating system wherein the oil is carried, drop by drop to the particular place where it is to be used. Furthermore, it will be noted that the gas does not enter the crank casing, but passes directly from the carburetor to the pump cylinders and from the pump cylinders to the engine cylinders, and therefore, there is no contact between the incoming fuel gas and the oil, except the contact of the fuel gas with the lubricated walls of the cylinders.

In Fig. 3 of the drawings I have shown more or less diagrammatically a section through the cylinders and have indicated by arrows the fuel gas before it is exploded and by circles of burnt gases after exploded. The cylinder 3 is at the position where the intake port is wide open and the fuel gases are coming in. The cylinder 4 is at the point of cut off, the fuel charge having been taken into this cylinder. The cylinder 5 shows the fuel gases being put under compression. The cylinder 6 shows a complete compression of the full stroke of the piston, the firing taking place at this point or slightly before or after, according to whether or not the spark is retracted or advanced. The cylinder 7 is at the point where the gases are expanding, working against the piston which is held stationary by the stationary crank, thus causing the engine casing to rotate. The piston 2 is at a point where the exhaust port is just about to open to relieve the burnt gases from all pressure and while the cylinder 2 is turning to the position of the cylinder 3, the pistons completely uncover the exhaust and intake ports, and it is at this point or just slightly in advance of this point, that the auxiliarly ring cuts off the exhaust port so as to prevent overflow of the incoming gases and under certain conditions, to bring about the initial compression in the cylinders.

By a relatively low pressure used throughout the description, I mean a pressure sufficiently low relative to the usual pressure present when gases are admitted to the cylinder so as to prevent turbulence or intermixing of the incoming gases with the burnt gases which are about to be exhausted.

While I have described in detail a radial cylinder engine, and one in which the radial cylinders rotate, it will be obvious that my improvements may be embodied in a rotary engine where the cylinders do not rotate, and also certain features may be embodied in any stationary two cycle type of engine.

It is also obvious that changes in the details of construction and the arrangement of the parts may be made without departing from the spirit of the invention as set forth in the appended claims.

Having thus described the invention, what I claim as new and desire to secure by Letters-Patent, is—

1. A two cycle gas engine including in combination a rotary casing, a plurality of twin cylinders connected at their outer ends, radially disposed and carried by said casing, a piston for each cylinder, piston controlled intake ports in one of said twin cylinders and piston controlled exhaust ports in the other of said twin cylinders, a reciprocating pump associated with each pair of twin cylinders, ports connecting the pumps with a common supply, a cut-off disk between the pumps and supply timed so that said pumps in turn draw a charge from the supply, the amount drawn being dependent upon the throttled condition of the supply, said pumps operating in succession to deliver the amount drawn from the supply to the intake ports with which said pump is associated.

2. A two cycle gas engine including in combination, a rotary casing, a plurality of twin cylinders connected at their outer ends, radially disposed and carried by said casing, a piston for each cylinder, piston controlled intake ports in one of said twin cylinders and piston controlled exhaust ports in the other of said twin cylinders, a reciprocating pump associated with each pair of twin cylinders, ports connecting the pumps with a common supply, a cut-off disk between the pumps and supply timed so that said pumps in turn draw a charge from the supply, the amount drawn being dependent upon the throttled condition of the supply, said pumps operating in succession to deliver the amount drawn from the supply to the intake ports with which said pump is associated, said pumps being so constructed as to deliver the fuel gas to its respective cylinder slowly and at a pressure sufficiently low to avoid turbulence of the gases in the cylinders.

3. A two cycle gas engine including in combination, a rotary casing, a plurality of twin cylinders connected at their outer ends, radially disposed and carried by said casing, a piston for each cylinder, piston controlled intake ports in one of said twin cylinders and piston controlled exhaust ports in the other of said twin cylinders, a reciprocating pump associated with each pair of twin cylinders, ports connecting the pumps with a common supply, a cut-off disk between the pumps and supply timed so that said pumps in turn draw a charge from the supply, the amount drawn being dependent upon the throttled condition of the supply, said pumps operating in succession to deliver the amount drawn from the supply to the intake ports with said pump is associated, said pumps being so constructed as to deliver the fuel gas to its respective cylinder slowly and at a pressure sufficiently low to avoid turbulence of the gases in the cylinders, and means independent of the piston for closing the exhaust ports in advance of the closing of the intake ports.

4. A two cycle gas engine including in combination, a rotary casing, a plurality of twin cyclinders connected at their outer ends, radially disposed and carried by said casing, a piston for each cylinder, piston controlled intake ports in one of said twin cylinders and piston controlled exhaust ports in the other of said twin cylinders, a reciprocating pump associated with each pair of twin cylinders, ports connecting the pumps with a common supply, a cut-off disk between the pumps and supply timed so that said pumps in turn draw a charge from the supply, the amount drawn being dependent upon the throttled condition of the supply, said pumps operating in succession to deliver the amount drawn from the supply to intake ports with said pump is associated, said pumps being so constructed as to deliver the fuel gas to its respective cylinder slowly and at a pressure sufficiently low to avoid turbulence of the gases in the cylinders, means independent of the piston for closing exhaust ports in advance of the closing of the intake ports, and means shiftable at will for varying the time of closing of the exhaust ports.

5. A two cycle gas engine including in combination, a plurality of cylinders having piston controlled intake ports, a reciprocating pump associated with each cylinder, ports connecting the pumps with a common supply, a cut-off disk between the pumps and the supply timed so that each pump draws from the supply by suction an amount of fuel gas determined by the throttled condition of the supply, and delivers said fuel gas directly to the cylinder with which it is associated.

6. A two cycle gas engine including in combination, a plurality of cylinders having piston controlled intake ports, a reciprocating pump associated with each cylinder, ports connecting the pumps with a common supply, a cut-off disk between the pumps and the supply timed so that each pump draws from the supply by suction an amount of fuel gas determined by the throttled condition of the supply and delivers said fuel gas directly to the cylinder with which it is associated, said pump being so proportioned and arranged as to deliver the gas continuously during the entire time that the intake ports are open to receive gas and at a pressure sufficiently low to prevent turbulence of the gases in the engine cylinders.

7. A two cycle gas engine including in combination a plurality of cylinders having piston controlled intake ports, a reciprocating pump associated with each cylinder, ports connecting the pumps with a common supply, cut-off disk between the pumps and the supply timed so that each pump draws from the supply by suction an amount of fuel gas determined by the throttled condition of the supply and delivers said fuel gas directly to the cylinder with which it is associated, said pump being so proportioned and arranged as to deliver the gas continuously during the entire time that the intake ports are open to receive gas and at a pressure sufficiently low to prevent turbulence of the gases in the engine cylinders, and means for closing the exhaust ports in advance of the closing of the intake ports.

8. A two cycle gas engine including in combination, a plurality of cylinders having piston controlled intake ports, a reciprocating pump associated with each cylinder, ports connecting the pumps with a common supply, a cut-off disk between the pumps and the supply timed so that each pump draws from the supply by suction an amount of fuel gas determined by the throttled condition of the supply and delivers said fuel gas directly to the cylinder with which it is associated, said pump being so proportioned and arranged as to deliver the gas continuously during the entire time that the intake ports are open to receive gas and at a pressure sufficiently low to prevent turbulence of the gases in the engine cylinders, said exhaust ports being so proportioned as to open in advance of the intake ports, and means independent of the pistons for closing the exhaust ports in advance of the closing of the intake ports.

9. A two cycle gas engine including in combination, a plurality of cylinders having piston controlled intake ports, a reciprocating pump associated with each cylinder, ports connecting the pumps with a common supply, a cut-off disk between the pumps and the supply timed so that each pump draws from the supply by suction an amount of fuel gas determined by the throttled condition of the supply and delivers said fuel gas directly to the cylinder with which it is associated, said pump being so proportioned and arranged as to deliver the gas continuously during the entire time that the intake ports are open to receive gas and at a pressure sufficiently low to prevent turbulence of the gases in the engine cylinders, said exhaust ports being so proportioned as to open in advance of the intake ports, and means independent of the pistons for closing the exhaust ports in advance of the closing of the intake ports, said last-named means being shiftable at will for varying the time of closing of the exhaust ports.

10. A two cycle gas engine including in combination a rotating casing, a plurality of twin cylinders radially disposed and carried by said casing, said cylinders being side by side, a piston for each cylinder, one of said twin cylinders having intake ports uncovered by its piston and the other of said twin cylinders having exhaust ports uncovered by its piston, a pump cylinder associated with each of the twin cylinders, a piston therefor, said pump cylinder being connected directly to the intake ports of the twin cylinders with which it is associated, a common supply, and ports connecting the pumps with said common supply, a cut-off disk between the pumps and the supply timed so that each pump draws from the supply an amount determined by the throttled condition of the supply, and delivers the amount drawn into the pump directly to the cylinder with which it is associated.

11. A two cycle gas engine including in combination, a rotating casing, a plurality of twin cylinders radially disposed and carried by said casing, said cylinders being side by side, a piston for each cylinder, one of said twin cylinders having intake ports uncovered by its piston and the other of said twin cylinders having exhaust ports uncovered by its piston, a pump cylinder associated with each of the twin cylinders, a piston therefor, said pump cylinder being connected directly to the intake ports of the twin cylinders with which it is associated, a common supply, ports connecting the pumps with said common supply, a cut-off disk between the pumps and the supply timed so that each pump draws from the supply an amount determined by the throttled condition of the supply and delivers the amount drawn into the pump directly to the cylinder with which it is associated, said pump and intake and exhaust ports being so proportioned that the fuel gases are delivered to the cylinders continuously during the time the intake ports are open to receive fuel gases, and at a pressure sufficiently low to prevent turbulence of the gases in the cylinders.

12. A two cycle gas engine including in combination, a rotating casing, a plurality of twin cylinders radially disposed and carried by said casing, said cylinders being side by side, a piston for each cylinder, one of said twin cylinders having intake ports uncovered by its piston and the other of said twin cylinders having exhaust ports uncovered by its piston, a pump cylinder associated with each of the twin cylinders, a piston therefor, said pump cylinder being connected directly to the intake ports of the twin cylinders with which it is associated, a common supply and ports connecting the pumps with said common supply, a cut-off disk between the pumps and the supply timed so that each pump draws from the supply an amount determined by the throttled condition of the supply and delivers the amount drawn into the pump directly to the cylinder with which it is associated, said pump and intake and exhaust ports being so proportioned that the fuel gases are delivered to the cylinders continuously during the time the intake ports are open to receive fuel gases, and at a pressure sufficiently low to prevent turbulence of the gases in the cylinders, and means independent of the pistons for closing the exhaust ports in advance of the intake ports.

13. A two cycle gas engine including in combination, a rotating casing, a plurality of twin cylinders radially disposed and carried by said casing, said cylinders being side by side, a piston for each cylinder, one of said twin cylinders having intake ports uncovered by its piston and the other of said twin cylinders having exhaust ports uncovered by its piston, a pump cylinder associated with each of the twin cylinders, a piston therefor, said pump cylinder being connected directly to the intake ports of the twin cylinders with which it is associated, a common supply, ports connecting the pumps with said common supply, a cut-off disk between the pumps and the supply timed so that each pump draws from the supply an amount determined by the throttled condition of the supply and delivers the amount drawn into the pump directly to the cylinder with which it is associated, said pump and intake and exhaust ports being so proportioned that the fuel gases are delivered to the cylinders continuously during the time the intake ports are open to receive fuel gases and at a pressure sufficiently low to prevent turbulence of the gases in the cylinders, said exhaust ports being so proportioned as to open in advance of the intake ports, and means independent of the pistons for closing the respective exhaust ports in advance of the intake port associated therewith.

14. A two cycle gas engine including in combination, a rotating casing, a plurality of twin cylinders connected at their outer ends, radially disposed and carried by said casing, a pump cylinder associated with each pair of twin cylinders and disposed close to and connected to the intake port for said cylinders, common means for supplying said pump cylinders, a stationary cut-off disk for connecting the pump cylinders in succession with the common supply, said pump pistons being timed so as to draw a charge from the supply and deliver the same direct to the pair of cylinders with which it is associated continuously during the time that the intake ports are open to receive fuel gas, and at a pressure sufficiently low so as to prevent turbulence in the cylinders.

15. A two cycle gas engine including in combination a rotating casing, a plurality of twin cylinders connected at their outer ends, radially disposed and carried by said casing, a pump cylinder associated with each pair of twin cylinders and disposed close to and connected to the intake port for said cylinders, common means for supplying said pump cylinders, a stationary cut-off disk for connecting the pump cylinders in succession with the common supply, said pump pistons being timed so as to draw a charge from the supply and deliver the same direct to the pair of cylinders with which it is associated continuously during the time that the intake ports are open to receive fuel gas and at a pressure sufficiently low so as to prevent turbulence in the cylinders, each pair of twin cylinders having a piston controlled exhaust port proportioned so as to open in advance of the intake port, and a stationary cut-off ring for closing the exhaust ports in advance of the closing of the intake ports.

16. A two cycle gas engine including in combination, a rotating casing, a plurality of twin cylinders connected at their outer ends, radially disposed and carried by said casing, a pump cylinder associated with each pair of twin cylinders and disposed close to and connected to the intake port for said cylinders, common means for supplying said pump cylinders, a stationary cut-off disk for connecting the pump cylinders in succession with the common supply, said pump pistons being timed so as to draw a charge from the supply and deliver the same direct to the pair of cylinders with which it is associated continuously during the time that the intake ports are open to receive fuel gas and at a pressure sufficiently low so as to prevent turbulence in the cylinders, each pair of twin cylinders having a piston controlled exhaust port proportioned so as to open in advance of the intake port, a stationary cut-off ring for closing the exhaust ports in advance of the closing of the intake ports, and means whereby the auxiliary cut-off ring may be shifted at will.

17. A two-cycle gas engine including in combination, a rotating casing having a plurality of radially disposed cylinders, a pump associated with each cylinder for delivering fuel gas thereto, a power shaft connected with said casing, a cap plate at the inner end of the power shaft for connecting said power shaft with the casing, said cap plate and power shaft having passages through which fuel passes to the pump, a stationary cut off disk for closing the port leading from the pump cylinder to the supply while said pump is delivering fuel gas to the cylinder.

18. A gas engine including in combination, a rotating casing, a power shaft connected to said casing, a plurality of radially disposed cylinders carried by the casing, means for delivering a charge of fuel gas to each cylinder, said power shaft having a supply passage connected with said delivering means, a carburetor connected with the power shaft but held from rotation therewith, and rotating screens located in the passage between the carburetor and the passage in the power shaft.

19. A gas engine including in combination, a rotating casing, a plurality of cylinders radially disposed and carried by the casing, a pump associated with each cylinder and carried by and rotating with the casing, a power shaft connected to the casing, said power shaft having a passage through which the fuel gases are led to the pumps, means for cutting off the pumps from the supply while the pumps are delivering to the cylinders, a casing carried by the shaft, a carburetor supported by the casing, said casing and shaft having ports leading to the carburetor, and radially disposed screens rotating with the power shaft and carried by said last-named casing for beating the fuel gases on their way to the pumps.

In testimony whereof, I affix my signature.

BENJAMIN FRANKLIN AUGUSTINE.